United States Patent [19]

Danielson et al.

[11] Patent Number: 5,943,774
[45] Date of Patent: Aug. 31, 1999

[54] METHOD OF MAKING A LOAD BEAM WITH INWARD STIFFENING CHANNEL

[75] Inventors: Reid C. Danielson, Cokato, Minn.; Michael W. Davis, Humboldt, Iowa; David R. Swift, Glencoe, Minn.

[73] Assignee: Hutchinson Technology, Inc., Hutchinson, Minn.

[21] Appl. No.: 09/163,133

[22] Filed: Sep. 29, 1998

Related U.S. Application Data

[62] Division of application No. 08/572,789, Dec. 15, 1995, Pat. No. 5,815,348.

[51] Int. Cl.$^6$ .................................................. B23P 13/00
[52] U.S. Cl. ........................................ 29/896.9; 29/603.03
[58] Field of Search ............................... 29/896.9, 603.03, 29/603.04, 603.05, 603.06; 360/104

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/104 |
| 4,443,824 | 4/1984 | Frater et al. | 360/104 |
| 4,716,478 | 12/1987 | Walsh et al. | 360/104 |
| 4,734,805 | 3/1988 | Yamada et al. | 360/104 |
| 4,853,811 | 8/1989 | Brooks, Jr. et al. | 360/104 |
| 4,933,791 | 6/1990 | Cheng | 360/104 |
| 4,996,616 | 2/1991 | Aoyagi et al. | 360/104 |
| 5,003,420 | 3/1991 | Hinlein | 360/104 |
| 5,027,240 | 6/1991 | Zarouri et al. | 360/104 |
| 5,027,241 | 6/1991 | Hatch et al. | 360/104 |
| 5,065,268 | 11/1991 | Hagen | 360/104 |
| 5,079,660 | 1/1992 | Yumura et al. | 360/104 |
| 5,081,553 | 1/1992 | Wanlass et al. | 360/103 |
| 5,131,871 | 7/1992 | Banakis et al. | 439/751 |
| 5,142,424 | 8/1992 | Hatamura | 360/104 |
| 5,166,846 | 11/1992 | Shigemoto | 360/104 |
| 5,225,949 | 7/1993 | King et al. | 360/104 |
| 5,225,950 | 7/1993 | Crane | 360/104 |
| 5,282,102 | 1/1994 | Christianson | 360/104 |
| 5,291,359 | 3/1994 | Wolter | 360/104 |
| 5,299,081 | 3/1994 | Hatch et al. | 360/104 |
| 5,408,372 | 4/1995 | Karam, II | 360/104 |

FOREIGN PATENT DOCUMENTS

| | | | |
|---|---|---|---|
| 0487914A2 | 6/1992 | European Pat. Off. | 360/104 |
| 59-213066 | 12/1984 | Japan | 360/104 |
| 61-122978 | 6/1985 | Japan | 360/104 |
| 60-226080 | 11/1985 | Japan | 360/104 |
| 63-144473 | 6/1988 | Japan . | |
| 1-62877 | 3/1989 | Japan . | |
| 94/16439 | 7/1994 | WIPO | 360/104 |

*Primary Examiner*—P. W. Echols
*Attorney, Agent, or Firm*—Faegre & Benson, LLP.

[57] ABSTRACT

A load beam of a suspension assembly has one or more longitudinal channels in the rigid region between the side edges. The load beam blank (from which the load beam itself is constructed) has a relief means, such as a channel-compensating gap extending through the actuator mounting region from the proximal end to provide additional width of sheet material to the rigid region of the load beam blank and to enable the formation of these longitudinal channels. A method for manufacturing a load beam of a suspension assembly from a generally planar sheet of resilient spring material is described. A load beam blank is shaped to include an actuator mounting region on the distal end, and a rigid region between the actuator mounting region and the distal end. A relief means, such as a channel-compensating gap extends through the actuator mounting region from the proximal end. At least one channel is constructed in the rigid region. The channel preferably extends between the gap and the distal end of the load beam and thereby reduces the width of the gap in the blank.

8 Claims, 5 Drawing Sheets

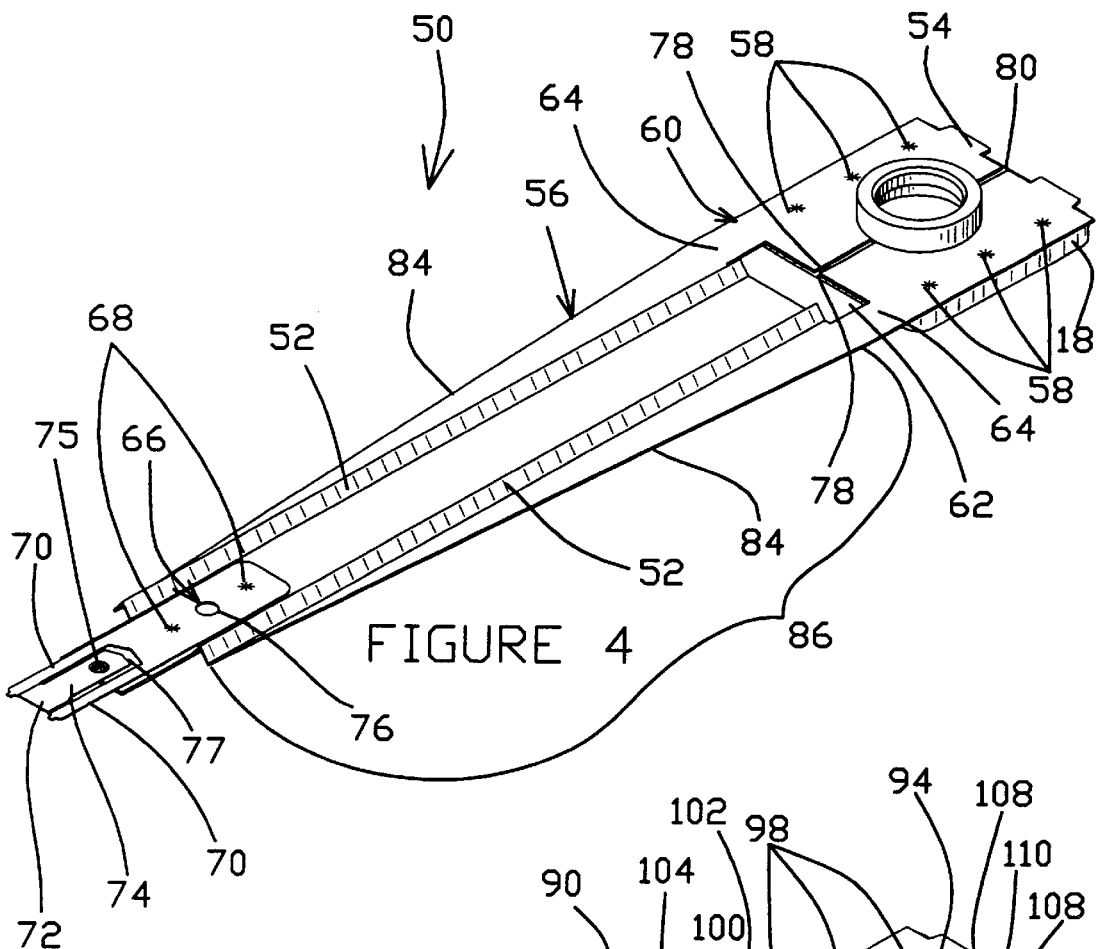
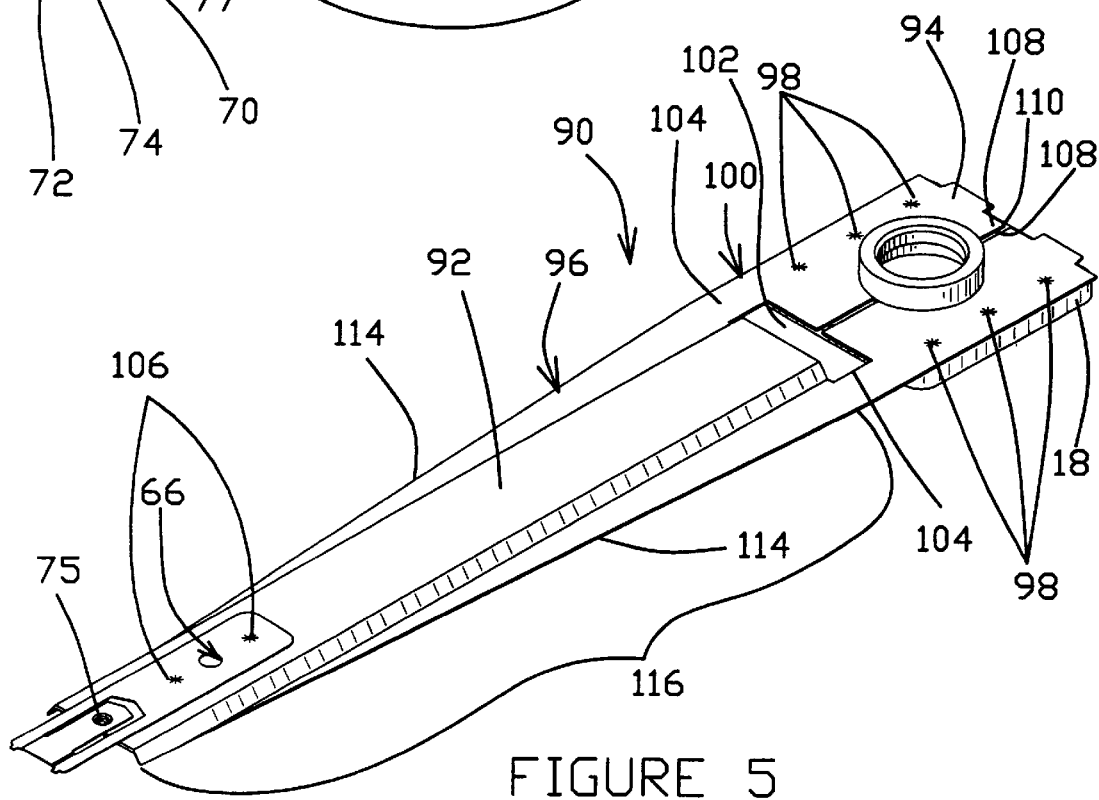

METHOD OF MAKING A LOAD BEAM WITH INWARD STIFFENING CHANNEL

This application is a Divisional application of U.S. patent application Ser. No. 08/572,789, filed Dec. 15, 1995 now U.S. Pat. No. 5,815,348.

FIELD OF THE INVENTION

The present invention relates to an improved load beam for a head suspension assembly to be used in dynamic storage devices or rigid disk drives. More specifically, this invention is directed to certain improvements in the construction of load beams of a suspension assembly by providing one or more generally longitudinal stiffening channels constructed on the surface of the load beam and spaced inward from its side edges.

BACKGROUND OF THE INVENTION

Load beams of head suspension assemblies are often provided with stiffening structures or other means for providing certain required mechanical properties to such load beams, such as rigidity to the length of the load beam and controlling the resonance frequencies of the load beam. Typically, stiffening rails or flanges are provided at the longitudinal edges of the load beam, such as by bending the edges out of the plane of the load beam. Such edge stiffening rails provide rigidity to the length of the load beam between a substantially resilient spring region at the proximal portion of the load beam (adjacent a portion of the load beam attached to the actuator arm of the disk drive) and the distal tip end of the load beam (which supports the head slider in read/write position to an associated disk). Greater height of the rails generally results in increased rigidity.

Moreover, the height of such edge stiffening rails also affects the resonance frequencies of the load beam. It is important in the design of load beams to design the geometries and features of such load beams so that they either possess resonance frequencies that are sufficiently high so as to be out of the range of vibration frequencies that may be experienced in particular disk drives or the like or to minimize the gain caused by any such resonance frequency. Moreover, as dimensions are reduced within disk drive devices and as head access speeds are increased, it becomes increasingly difficult to provide small enough head suspension assemblies having the requisite mechanical properties.

Another manner of increasing rigidity is to simply form the load beams from thicker materials. However, increased thicknesses also undesirably result in increased spring constants. Increased thicknesses also increase the mass of the load beam which generally has a negative effect on resonance frequencies and slows the response time for disk access. Rails are advantageous in that the mechanical properties of load beams can be controlled without negative effects on the spring constant and with less mass. A disadvantage of side rails, however, is that they add mass as far away from the center line of the load beam as possible which can negatively affect torsional resonance frequencies.

Load beams having side edge rails for increasing rigidity are described, for example, in U.S. Pat. Nos. 3,931,641, 4,734,805, 4,853,811, 4,933,791, 5,003,420, 5,027,240, 5,027,241, 5,079,660, and 5,081,553.

Stiffening structures provided on the surface of the load beam have also been developed. Such load beams are described, for example, in U.S. Pat. Nos. 3,931,641, 4,996,616, 5,131,871, 5,142,424, 5,166,846, and Japanese unexamined published application 1-62877. An advantage of surface stiffening or reinforcing structures spaced from the load beam edges is the ability to control mechanical properties with more ribs at lower heights. Moreover, surface structures permit the added mass to be more centrally located along the center line of the load beam to lessen the negative effects of the greater mass on torsional resonance frequencies. The Aoyagi et al. reference, U.S. Pat. No. 4,996,616, specifically discloses load beams having both surface reinforcement ribs that are spaced from the side edges and bent side edges. The advantage of the Aoyagi et al. design is that the combination of the bent side edges with the reinforcing ribs can be together used to control the mechanical properties for optimized rigidity and resonance frequencies. Again, overall height can be reduced. These advantages, however, may come at the expense of increased production costs in making the surface stiffening structures or ribs, particularly when additional components and/or further processing steps, such as metal reworking, are required.

SUMMARY OF THE INVENTION

A magnetic head suspension load beam according to this invention has one or more longitudinal channels in the rigid region of the load beam and between the side edges. The load beam blank (from which the load beam itself is constructed) is made of increased width (as compared to the width of the final load beam) along at least part of its length to provide sufficient material for bending and forming the one or more longitudinal channels. To avoid having this increased width in the area of the actuator mounting region, the load beam blank is preferably provided with a relief means, such as a channel-compensating gap which extends through the actuator mounting region of the load beam from the load beam proximal end. Thus, the entire load beam, including the longitudinal channels formed from the load beam blank itself, can be made of uniform thickness. The load beam is also preferably fabricated from a generally planar sheet of resilient spring material, such as stainless steel. The load beam can be configured to be mounted to a disk drive actuator arm or may be otherwise configured depending on the specific mounting requirements of the end use device. In any case, an actuator mounting region is provided on the proximal end of the load beam for mounting the load beam to the actuator arm or the like. The rigid region is provided in the load beam between the actuator mounting region and the distal end and is provided with the one or more channels, described above, over at least part of its length. Moreover, a flexible spring region is usually provided between the actuator mounting region and the rigid region for providing an applied force to the head, as is well understood. The suspension assembly of the present invention thus exhibits the aforementioned advantages of surface stiffening structures (the ability to increase rigidity and improve resonance frequency response with less height), but does so with a minimum of further processing and without additional components.

According to the present invention, a method for manufacturing a magnetic head suspension load beam from a generally planar sheet of resilient spring material is described as follows. A load beam blank is shaped having proximal and distal ends. The blank includes an actuator mounting region on the proximal end, and a rigid region with side edges which extends between the actuator mounting region and the distal end. Preferably, a flexible spring region, as described above, is also provided between the actuator mounting region and the rigid region. The load beam blank (from which the load beam itself is constructed)

is of increased width (as compared to the width of the final load beam) along at least part of its length to provide sufficient material for bending and forming the one or more longitudinal channels. The load beam blank is also provided with a relief means, such as a channel-compensating gap which extends through the actuator mounting region of the load beam from the load beam proximal end. By this method, one or more continuous channels can be formed in the rigid region of the load beam between the side edges of the load beam without substantial metal reworking or additional component parts. Such channel may extend longitudinally completely or only partially from the distal end of the channel-compensating gap to the distal end of the load beam. The forming of the channel results in a reduction of the width along the longitudinal portion of the load beam corresponding to the channel as well as the channel-compensating gap of the finished load beam.

BRIEF DESCRIPTION OF THE DRAWINGS

FIG. 4 is a top isometric view of a suspension assembly of the present invention with two interior stiffening channels.

FIG. 5 is a top isometric view of a suspension assembly of the present invention in which the interior stiffening channel comprises a wide single channel.

DETAILED DESCRIPTION OF THE INVENTION

Figure 1:
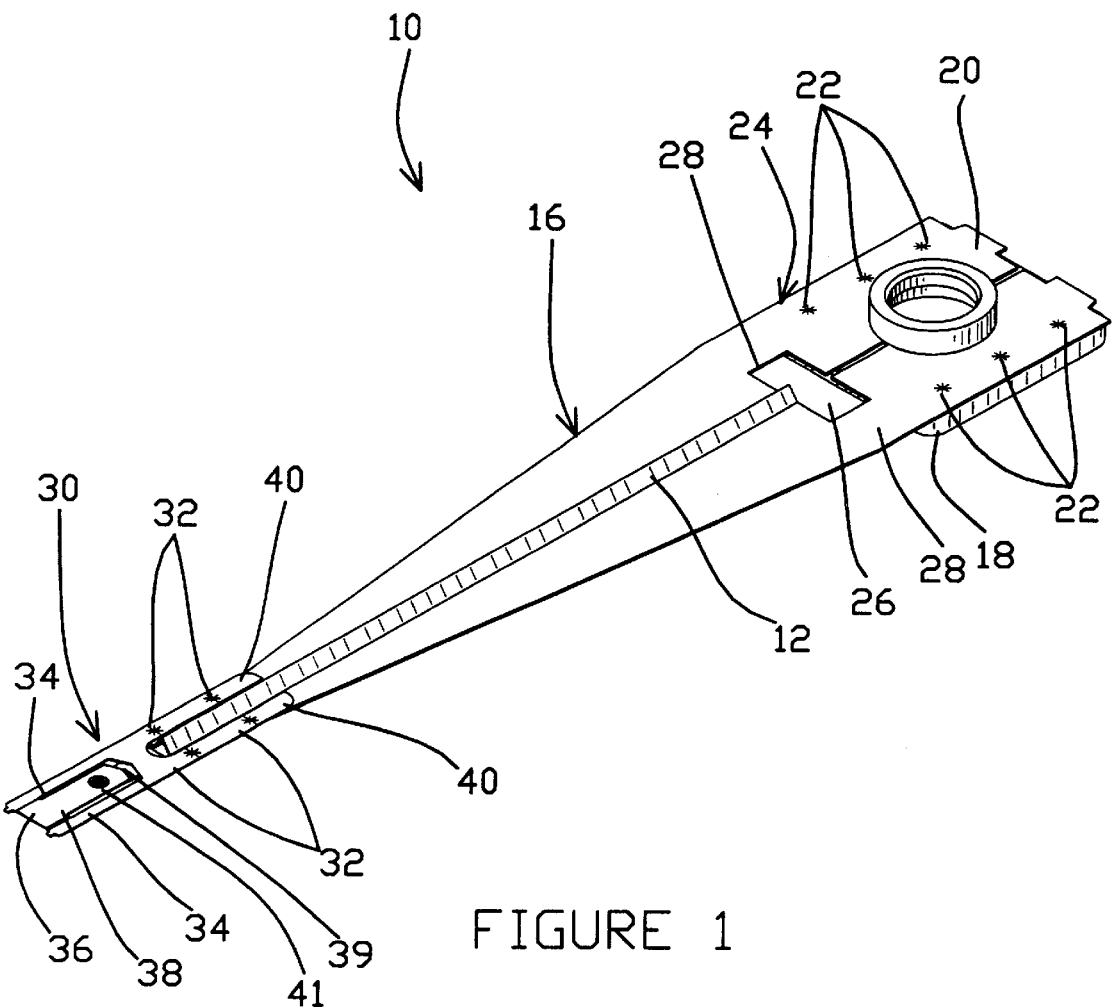
FIG. 1 is a top isometric view of a suspension assembly incorporating an interior stiffening channel according to the present invention.
Figure 2:
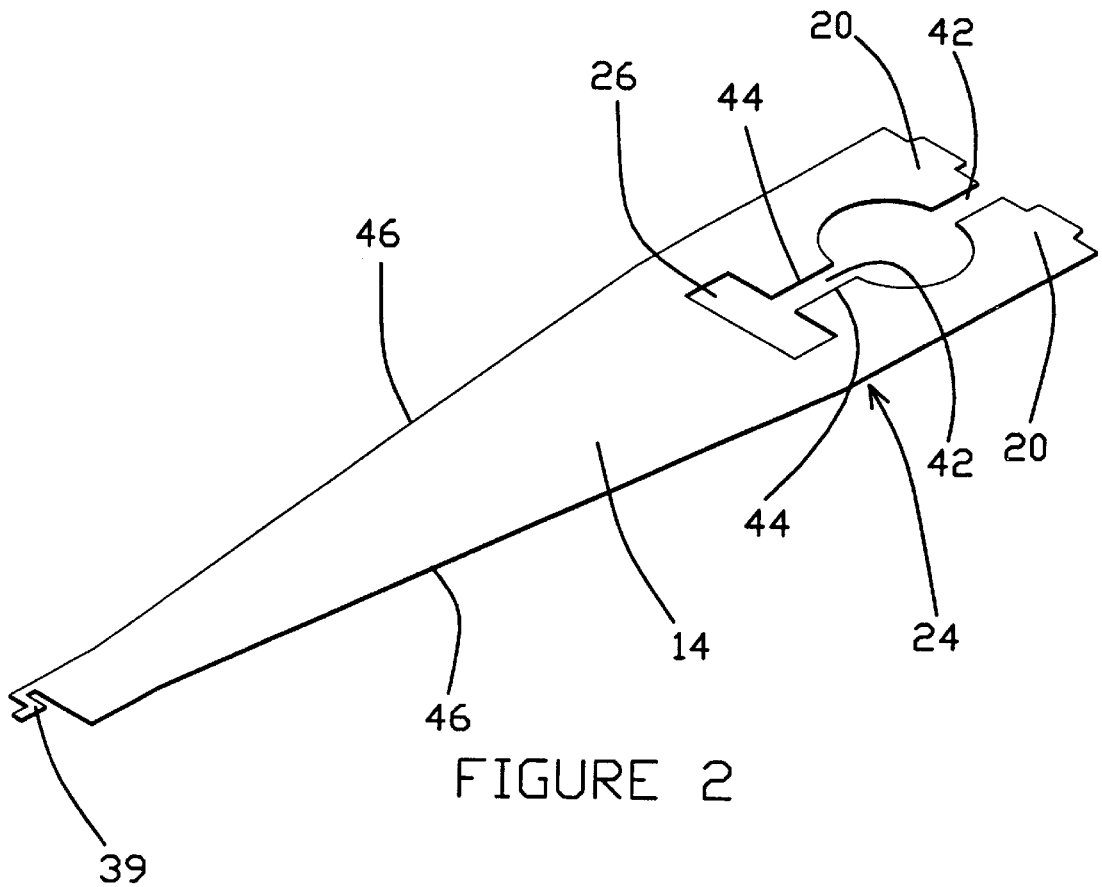
FIG. 2 is a load beam blank from which the load beam of FIG. 3 can be formed.
Figure 3:
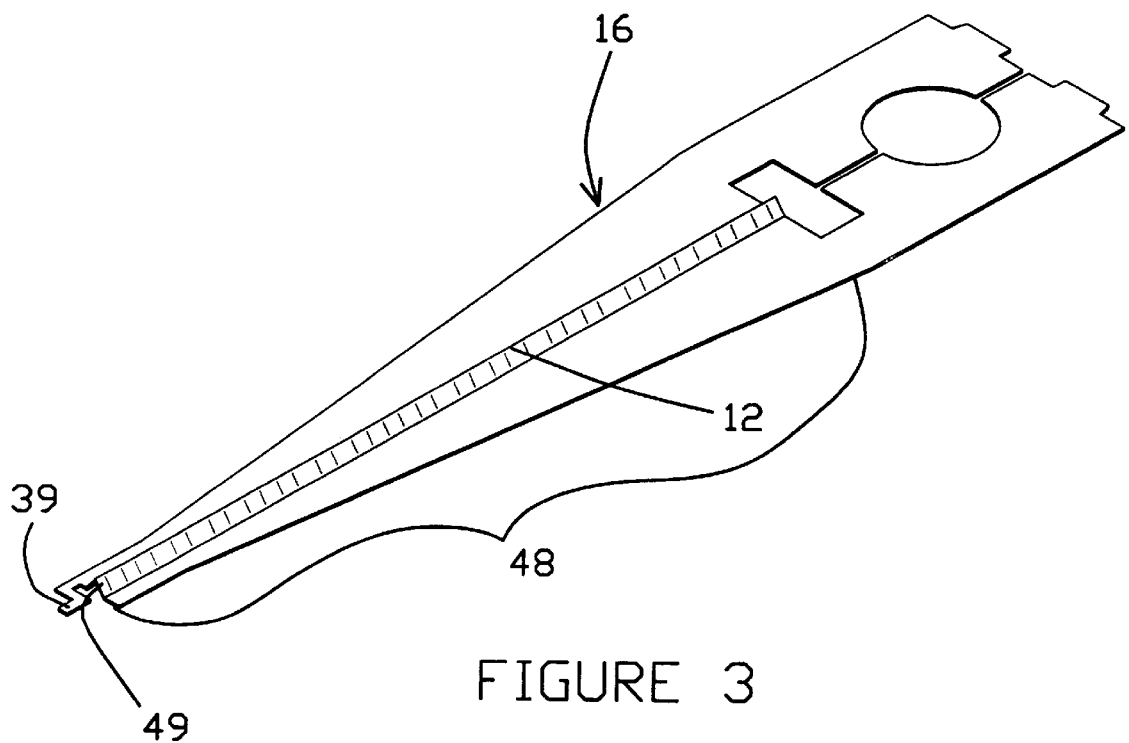
FIG. 3 is a load beam formed from the blank of FIG. 2 and incorporated into the suspension assembly of FIG. 1.

FIGS. 1–3 illustrate a first embodiment of a suspension assembly 10 and load beam 16 according to the present invention. FIG. 1 is a top isometric view of a suspension assembly 10 incorporating one version of an interior stiffening channel 12 according to the present invention. In FIG. 2, a load beam blank 14 is shown from which a load beam 16, shown in FIG. 3, can be formed and which is incorporated into the suspension assembly 10 of FIG. 1. The suspension assembly 10 is configured at its proximal end with a base plate 18 attached to the actuator mounting region 20 of the load beam 16 by welds 22 for mounting to an actuator arm (not shown). As used throughout this specification, welds are a preferred manner of interconnecting metal elements, including conventional welding techniques. Other connecting methods including mechanical fasteners, adhesives, and the like are also contemplated. A spring or resilient region 24, just distal of the actuator mounting region 20, is configured with a cut-out 26 to define two outer resilient legs 28.

A flexure 30 is attached to the distal end of the load beam 16 by welds 32. Although a formed flexure is illustrated at 30, it is understood that other type flexures can be used with the load beam 16 of the present invention. At the distal end of the illustrated flexure 30, the outer flexible arms 34 are connected at their distal ends by a cross-piece 36 elevated from the plane of the flexure 30 and from the plane of the flexible arms 34. A flexure tongue 38 extends proximally from the cross-piece 36 and in the same plane as the cross-piece 36. The proximal end of the flexure 30 is provided with a pair of proximally extending legs 40 which are secured to the load beam 16 on either side of the interior stiffening channel 12 by means of welds 32. A loading portion 39 of the load beam 16 is preferably formed integrally therewith and extends over a portion of the flexure tongue 38. Alternatively, the loading portion 39 could be provided from a separately formed element secured with the load beam 16. The loading portion 39 is for applying a load force to a dimple 41 (illustrated from the concave side) on flexure tongue 38 as is known for loading the flexure tongue 38 and a slider (not shown) to counter the lift force applied to the slider as it "flies" over a rotating disk surface while permitting pitch and roll flexibility of the slider.

FIG. 2 illustrates a load beam blank 14 from which the load beam 16 of FIG. 3 can be formed, and to be incorporated into the suspension assembly 10 of FIG. 1. The load beam blank 14 is preferably formed out of a planar piece of resilient sheet material, typically stainless steel. The blank 14 is provided with a relief means for permitting the forming of stiffening channel 12 in a rigid region of the load beam 16 without forming the channel in the actuator mounting region 20. Preferably, channel-compensating gap 42 is provided longitudinally dividing the actuator mounting region 20 from the proximal end of the load beam 16 to the cut-out 26 in the resilient region 24. The channel-compensating gap 42 is preferably generally longitudinally aligned with or parallel to a longitudinal axis of the load beam 16; however, any alignment is contemplated provided that the channel 12 can be formed without an adverse formation in the actuator mounting region 20.

One manner of providing an undeformed loading portion 39 as an integral part with the load beam 16 is illustrated in FIGS. 2 and 3. Loading portion 39 includes an offset section that is connected to the load beam blank 14 at a portion thereof that is to the outside of where the channel 12 is to be formed. This way, the channel 12 can be formed without deforming the loading portion 39 while at the same time postioning the loading portion 39 along the longitudinal center of the load beam 16. If a separate element is used to make the loading portion 39, it could be similarly connected to the load beam blank 14 before forming the channel 12 or could be connected anywhere to the load beam 16 after the channel 12 is formed.

As shown in FIG. 2, gap 42 is defined between inward edges 44 of the actuator mounting region 20. The distance between the edges 44 of the gap 42 is preferably substantially constant (except for the edges defining the actuator mounting opening) and sufficient so that upon collapsing the width of the rigid region of the load beam 16 during the formation of stiffening channel 12, edges 44 will not interfere with one another. Preferably, the edges 44 nearly or just contact one another after stiffening channel 12 is formed. Thus, the distance between edges 44 at their closest point should be at least as great as the total. amount of horizontal collapse caused by the formation of stiffening channel 12.

It is also contemplated that a gap may remain between edges 44 after collapsing and the stiffening channel 12 is formed. In other words, the channel forming gap 42 of load beam blank 14, at its closest points, can be greater than the amount of horizontal shifting caused by formation of stiffening channel 12. Furthermore, the edges 44 need not be parallel to one another at any point and they need not be straight either before or after channel formation. Moreover, edges 44 can be arranged nonparallel with the longitudinal axis of the load beam 16 and/or with one another. The size of any gap remaining between edges 44 after collapse and formation of stiffening channel 12 is only limited by the ability to sufficiently mount the actuator mounting region 20, such as to base plate 18.

As above, it is preferable that the relief means includes a channel-compensating gap whereby the edges 44 do not interfere with one another after the stiffening channel 12 is formed. It is, however, contemplated that the relief means can be otherwise provided and that non-interfering contact can be provided in different ways. For example, one or both of the edges 44 can be offset from one another with respect to the plane of the load beam so that during the channel formation step, the portions of the actuator mounting region 20 that are adjacent edges 44 overlap and lie on top of one another. Again, the only limitation is that the actuator mounting region 20 be sufficient for mounting such as to its base plate 18.

By virtue of the relief means, such as the channel compensating gap 42, the sheet material of the entire load beam 16, including the upstanding sides 49 of the stiffening channel 12 can be of similar uniform thickness, which can be the same thickness as the sheet material from which the load beam blank 14 was originally cut. In other words, the formation process does not include a metal reworking step whereby the metallurgical properties of the material are substantially changed. Moreover, the subject invention provides for the making of a stiffening channel without additional components.

FIG. 4 is top isometric view of an alternative suspension assembly 50 incorporating a pair of spaced interior stiffening channels 52 according to the present invention. The suspension assembly 50 is configured at its proximal end with a base plate 18 attached to the actuator mounting region 54 of the load beam 56 by welds 58 for mounting to an actuator arm (not shown). A spring or resilient region 60, just distal of the actuator mounting region 54, is configured with a cut-out 62 to define two outer resilient legs 64.

A flexure 66 is attached to the distal end of the load beam 56 by welds 68. Other flexure types can also be accommodated. At the distal end of the flexure 66, in accordance with the illustrated embodiment, the outer flexible arms 70 are connected at their distal ends by a cross-piece 72 elevated from the plane of the flexure 66 and from the plane of the flexible arms 70. The flexure tongue 74 extends proximally from the cross piece 72 and in the same planelas the cross-piece 72. The proximal end of the flexure 66 is provided with an aperture 76 to facilitate locating the flexure 66 in alignment with the load beam 56 during assembly. A loading portion 77 of the load beam 56 is provided either integrally or separately and preferably extends beyond the channels 52. The loading portion 77 applies a load force to a dimple 75 (illustrated from the concave side) on flexure tongue 74, as known for loading the flexure tongue 74 and a slider (not shown) when mounted thereto and in use flying over a disk surface.

In order to accommodate the formation of channels 52 between side edges 84 in the rigid region 86 of the load beam 56 and not the actuator mounting region 54, a relief means is also provided. Such relief means preferably comprises a channel-compensating gap 80 defined between inward edges 78 within the actuator mounting region 54. In order to provide sufficient sheet material for bending and forming the two channels 52, the gap 80 is provided between the inward edges 78 in the form of the load beam blank (not shown), from which the load beam 56 is to be formed. Preferably, the gap 80 is sufficient so that after forming the two channels 52, the edges 78 nearly or just touch one another. In other words, the gap 80, before collapsing, is equal to or greater than the total horizontal component of the collapse that results from the formation of both channels 52. Again, the gap need not be of equal spacing, before or after channel forming, a significant gap may be present after channel forming, and/or the gap may be aligned with or otherwise related to the longitudinal axis of the load beam 56. The actuator mounting region 54 should, however, be suitable for its intended mounting use.

FIG. 5 is a top isometric view of an alternative suspension assembly 90 incorporating a centrally positioned longitudinal wide channel 92 according to the present invention. The suspension assembly 90 is configured at its proximal end with a base plate 18 attached to the actuator mounting region 94 of the load beam 96 by welds 98 for mounting to an actuator arm (not shown). A spring or resilient region 100, just distal of the actuator mounting region 94, is configured with a cut-out 102 to define two outer resilient legs 104.

A flexure 66, which according to the illustrated embodiment is the same as the flexure 66 used in constructing the suspension assembly 50 of FIG. 4, is attached to the distal end of the wide channel 92 of the load beam 96 by welds 106. In this case, however, a loading portion is provided by a distal end portion of the top surface of channel 92. The loading portion applies a load force to the dimple 75 (illustrated from the concave side) as known for providing an appropriate load force to the flexure tongue 74 and a slider (not shown) when mounted thereto and in use. Again, other flexure types are contemplated to be similarly used.

In order to accommodate the formation of the wide channel 92 between edges 114 within the rigid region 116 of the load beam 96 and not the actuator mounting region 94, a relief means is also provided. Preferably, the relief means comprises a channel compensating gap 110 defined between inward edges 108 within the actuator mounting region 94. To provide sufficient sheet material for bending and forming the wide channel 92 the gap 110 is provided between, the edges 108 in the form of the load beam blank (not shown), from which the load beam 96 is to be formed. The gap 110 is preferably sufficiently sized so that after forming the wide channel 92, the edges 108 nearly or just touch one another. In other words, the gap 110, before collapsing, is equal to or greater than the total horizontal component of the collapse necessary to form the wide channel 92. Again, the gap need not be of equal spacing, before or after channel forming, a significant gap may be present after channel forming, and/or the gap may be aligned with or otherwise related to the longitudinal axis of the load beam 96. The actuator mounting region 94 should, however, be suitable for its intended mounting use.

Figure 8:
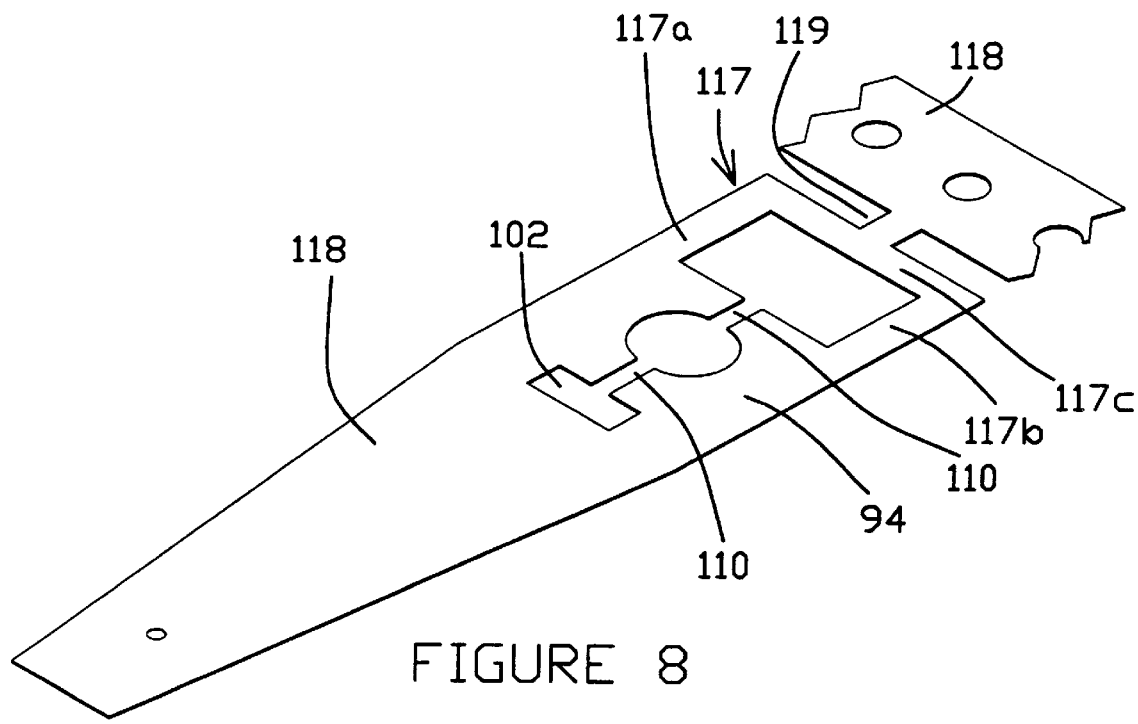
FIG. 8 is a load beam blank from which the load beam of FIG. 9 can be formed.
Figure 9:
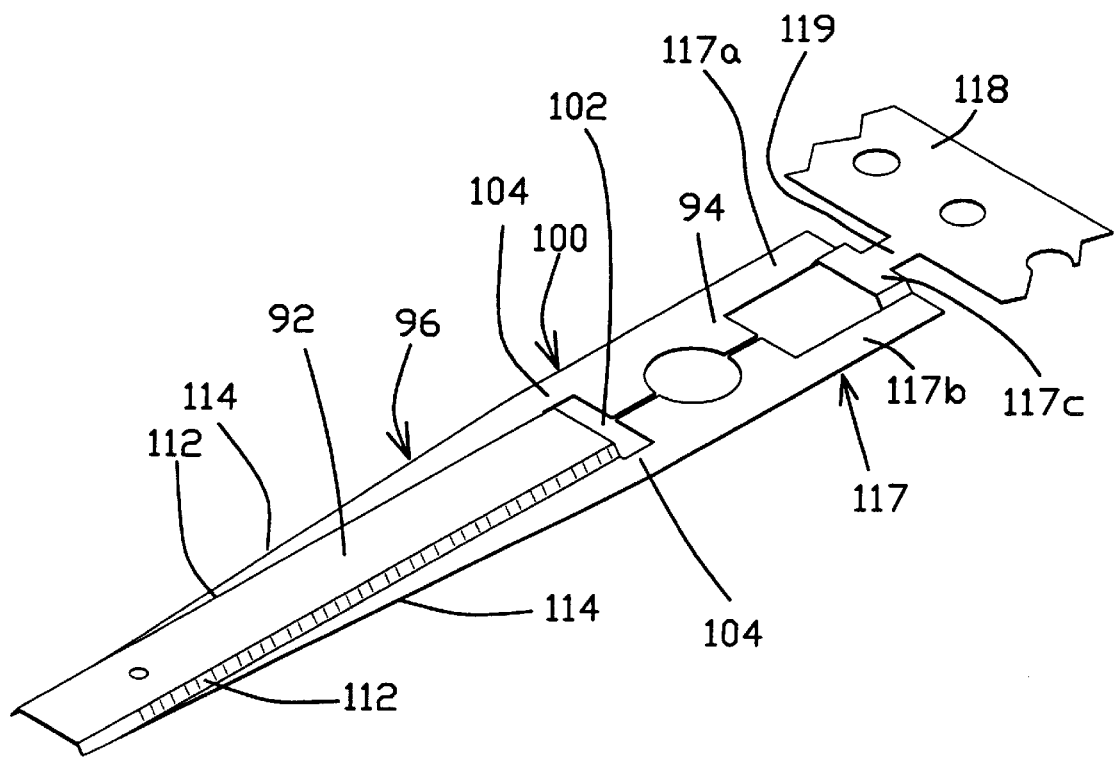
FIG. 9 is a load beam formed from the blank of FIG. 8 and incorporated into the suspension assembly of FIG. 5.

One manner of making the support assembly 90 of FIG. 5 is illustrated in FIGS. 8 and 9. Starting with FIG. 8, a load beam blank 118 is provided with a tab region 117 which is attached to a carrier strip 118 by a tab 119. Within the tab region 117, an opening is preferably provided defining side legs 117a and 117b and a cross-piece 117c. Cross-piece 117c is preferably connected to the tab 119 at a central portion thereof. Carrier strips are conventionally known for supporting plural load beam blanks during the forming process and the load beams are typically separated from the carrier strip after the formation steps. Known methods use plural attachment tabs as the tab portion between the actuator region and the carrier strip.

According to the preferred embodiment, a cut-out 102 is provided in the resilient region 100 along with a mounting hole through the actuator mounting region 94 and a channel-compensating gap 110. Note that the mounting hole and the cut-out 102 are increased in width by the amount of the width of the channel-compensating gap 110.

In making the load beam 96, a next step is to form wide channel 92 within the rigid region of the load beam 96. The manner of forming the wide channel 92 can be any conventional metal forming process including bending or stamping. As a result of the formation of channel 92, cut-out 102 and the channel-compensating gap 110 collapse within the general plane of the load beam 96. As shown, the width of channel-compensating gap 110 before formation of the channel 92 is sufficient to accommodate substantially the entire horizontal component of collapse caused during the formation of channel 92. In other words, edges 108 just touch or nearly touch one another after channel 92 is formed. At the same time, tab region 117 is collapsed and bends are formed in the cross-piece 117c corresponding to the formation of the channel 92 of the rigid region. The width of tab 119 is kept sufficiently small and between the bends in cross-piece 117c so that no bends are formed in the tab 119 or the carrier strip 118. The opening within the tab region 117 allows the formation of the bends in the cross-piece 117c without affecting the actuator mounting region 94, although a simple transverse slit would also suffice. Thereafter, the load beam 96 can be conventionally separated from the carrier strip 118 and further processed into a suspension assembly. In the case of a gimbal type assembly the gimbal region may be formed before or after forming the channel. Likewise, a flexure can be attached before or after the channel-forming operation.

Figure 6:
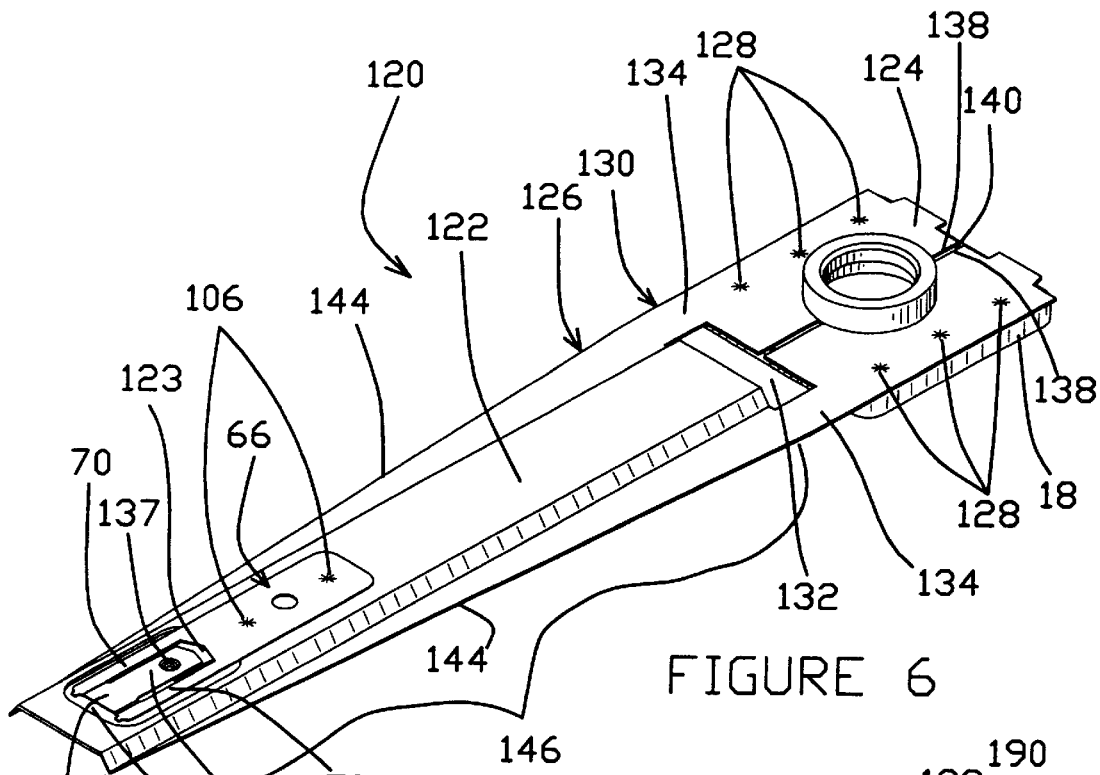
FIG. 6 is a top isometric view similar to FIG. 5 with a central wide stiffening channel but with an aperture provided through the top surface of the channel for accommodating the flexure of the support assembly.

FIG. 6 is a top isometric view of another suspension assembly 120 incorporating a centrally positioned longitudinal wide channel 122 according to the present invention. The suspension assembly 120 is configured at its proximal end with a base plate 18 attached to the actuator mounting region 124 of the load beam 126 by welds 128 for mounting to an actuator arm (not shown). A spring or resilient region 130, just distal of the actuator mounting region 124, is configured with a cut-out 132 to define two outer resilient legs 134.

A flexure 66, which according to the illustrated embodiment is the same as the flexure 66 used in constructing the suspension assembly 50 of FIG. 4 and the suspension assembly 90 of FIG. 5, is attached to the distal end of the wide channel 122 of the load beam 126 by welds 106. The distal end of the flexure 66 is positioned so that the outer flexible arms 70, the cross-piece 72 and a portion of the flexure tongue 74 are all supported over a large aperture 135 provided through the top surface of the wide channel 122 of the load beam 126. Preferably, a loading portion 123 extending from the top surface of the wide channel 122 of the load beam 126 is provided within the aperture 135. The loading portion 123 can be integrally or separately provided and is used for engaging a dimple 137 (illustrated from the concave side) of the flexure tongue 74, as known for applying an appropriate load force to the flexure tongue 74 and a slider (not shown) when mounted thereto and in use. Again, other flexure types are contemplated to be similarly used.

In order to accommodate the formation of the wide channel 122 between edges 144 within the rigid region 146 of the load beam 126 and not the actuator mounting region 124, a relief means is again also provided. Preferably, the relief means comprises a channel compensating gap 140 defined between inward edges 138 within the actuator mounting region 124. To provide sufficient sheet material for bending and forming the wide channel 122, the gap 140 is provided between the edges 138 in the form of the load beam blank (not shown), from which the load beam 126 is to be formed. The gap 140 is preferably sufficiently sized so that after forming the wide channel 122, the edges 138 nearly or just touch one another. In other words, the gap 140, before collapsing, is equal to or greater than the total horizontal component of the collapse necessary for form the wide channel 122. Again, the gap need not be of equal spacing, before or after channel forming, a significant gap may be present after channel forming, and/or the gap may be aligned with or otherwise related to the longitudinal axis of the load beam 126. The actuator mounting region 124 should, however, be suitable for its intended mounting use.

Figure 7:
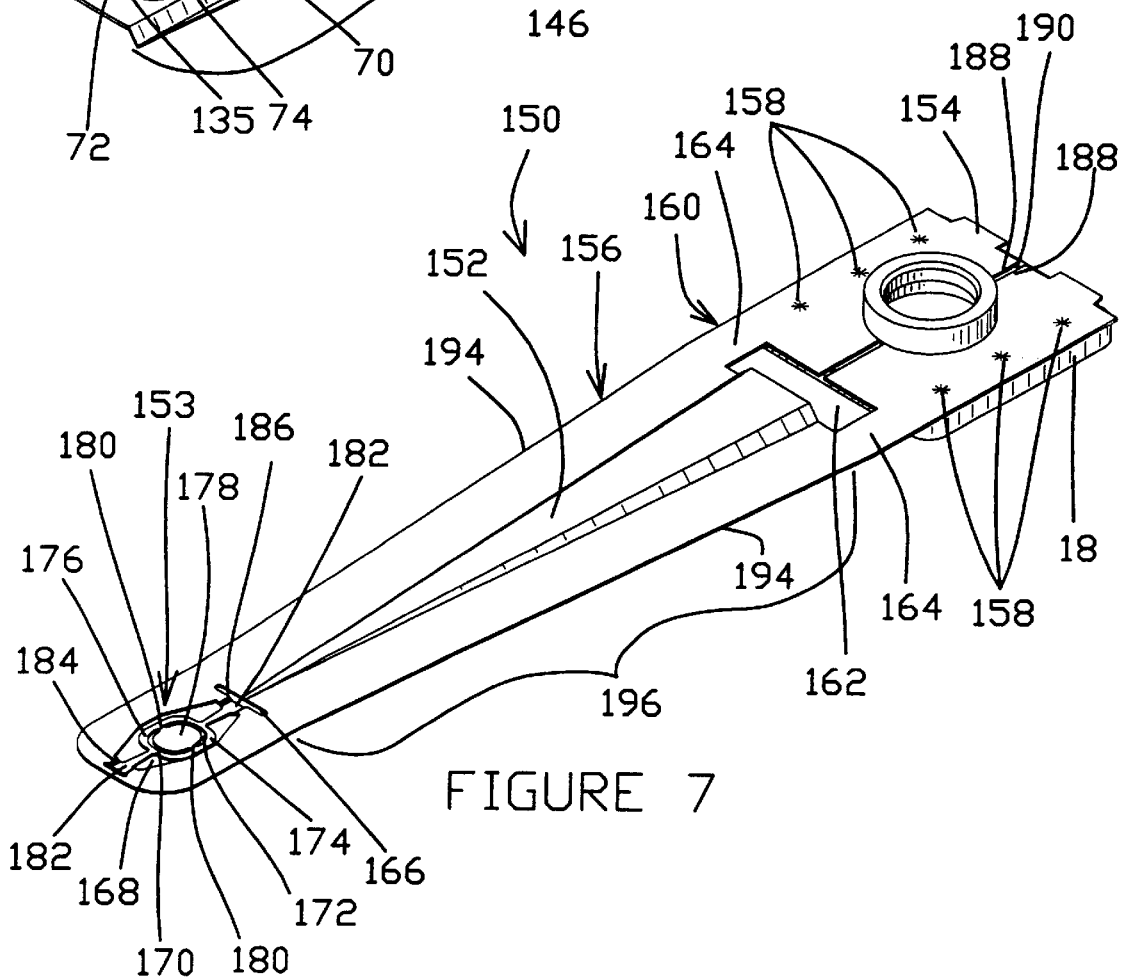
FIG. 7 is a top isometric view of a support assembly including an integrated gimbal and having a stiffening channel formed in its rigid region which is of decreasing width and height toward its distal end.

FIG. 7 is a top isometric view of another suspension assembly 150 incorporating a centrally positioned longitudinal channel 152 according to the present invention with an integral gimbal 153. The suspension assembly 150 is configured at its proximal end with a base plate 18 attached to the actuator mounting region 154 of the load beam 156 by welds 158 for mounting to an actuator arm (not shown). A spring or resilient region 160, just distal of the actuator mounting region 154, is configured with a cut-out 162 to define two outer resilient legs 164.

A gimbal region 153, according to the illustrated embodiment, is constructed as a single element with the load beam 156 and at the distal end of the load beam 156. Other gimbal types are also contemplated. The gimbal region is constructed by providing a number of apertures or slots 166, 168, 170, 172 at distal end of the single element combining the load beam 156 and the gimbal region 153. The apertures or slots 166, 168, 170, 172 define a plurality of flexible arms 174, 176 which provide low stiffness in the pitch and roll axes to allow the head support means 178 to move freely about those axes while providing high translational stiffness to keep the head mounted on the head support means 178 from moving from side to side or from front to back as the actuator moves the slider across the face of the disk.

In the single element combining the load beam 156 and the gimbal region 153 of FIG. 7, slots 170, 172 which enclose at least a portion of the perimeter of the head support means 178 leave only connecting bridges 180 between the edges of the head support means 178 and the remainder of the gimbal region 153. Thus, the head support means 178 is relatively freely pivotable about a first axis drawn through connecting bridges 180, which connect head support means 178 to the flexible arms 174, 176, which are themselves interconnected to the gimbal region 153 by elongated connecting bridges 182. The elongated connecting bridges 182, when interconnected by a second axis drawn through them, suspend head support means 178 and flexible arms 174, 176, about a second axis orthogonal to the first axis. Thus, as can be seen in FIG. 7, elongated connecting bridges 182 are substantially longer than connecting bridges 180, so that flexible arms 174, 176 together essentially form a circle and so that apertures of slots 170, 172 together also essentially form a circle. The first axis can generally be referred to as a pitch axis while the second axis can generally be referred to as a roll axis. Offsets 184, 186 are formed in the surface of the gimbal region 153 to provide clearance for a head mounted on head support means 178 by vertically adjusting its position relative to the surface of the gimbal region 153.

Offsets 184, 186 allow the entire head support means 178 and the flexible arms 174, 176 to be placed out of plane with respect to the load beam 156. By moving the head support means 178 and the flexible arms 174, 176 out of plane with respect to the load beam 156, it can be assured that the read/write head does not contact the load beam 156, which would frustrate its ability to gimbal. Offsets 184, 186 allow changing the pitch and roll angles of the head support means 178 with respect to the load beam 156.

Channel 152 is formed within the rigid region 196 between side edges 194. Like the above embodiments, formation of the channel 152 is accommodated within the actuator mounting region 154 by a relief means. The relief means preferably comprises a channel compensating gap 190 between inward edges 188 and extending from the cut-out 162 through the actuator mounting region 154.

The channel 152, as shown, converges from the cut-out 162 toward the gimbal region 153 in both the width and height of channel 152. That is, the channel 152 is formed with its widest and highest points nearest cut-out 162 and then converging to zero height and zero width near the gimbal region 15X. In order to come up with the load beam 156 construction shown in FIG. 7 having edges 188 substantially parallel to one another after formation of the channel 152, the load beam blank (not shown) utilized in the formation would have a converging gap 190 starting from the proximal end of the actuator mounting region 154 toward the cut-out 162.

As above, the edges 188 preferably nearly or just touch one another after formation of the channel 152. To do this, the gap 190, would be defined as noted above and would be sufficiently wide in the load beam blank stage such that upon formation of the channel 152, the gap 190 would collapse by an amount corresponding to the amount of horizontal collapse caused by the formation of channel 152. With the formation of a converging channel 152, the collapse of gap 190 would not be even. Again, the gap 190 need not be of equal spacing after formation of the channel 152, and any amount of gap, whether even or otherwise can remain after formation of the channel 152, so long as a sufficient actuator mounting region 154 is provided, which is dependent on the end use.

The FIG. 7 embodiment, as discussed above, shows a wide channel 152 that is converging both in height and width from the proximal end of load beam 156 toward its distal end. Alternatively, such a load beam can incorporate a channel that is converging in the same direction in only one dimension. That is, the channel may converge only in width or in height. Moreover, depending on the desired mechanical properties for such a load beam, the channel may instead be diverging in the same direction, instead of converging, in either or both the height and width dimensions.

Furthermore, as a modification to any of the above-described embodiments, the described channels need, not, necessarily extend entirely from the cut-out defining the spring or resilient region of each of the aforementioned load beams all the way to the flexure or gimbal region of the load beam. Again, depending on the desired mechanical properties defined by the use of each particular suspension assembly, the channel or channels may be modified. Additionally, it is contemplated that any number of combinations of the above-described embodiments can be utilized. For example, any number of narrow channels internal from the side edges can be used together, or may be combined with one or more wide channels. Combination channels themselves are also contemplated. For example, a wide channel may be provided with one or more narrow channels within its raised surface. In any case, according to the present invention, whatever channel configuration is desired, the actuator mounting region of such load beam is to be provided with a relief means which permits the formation of the channels internal of the side edges without negatively affecting the actuator mounting region. Again, the preferred manner of doing this is providing a channel-compensating gap within the actuator mounting region of the load beam blank so that when the channel or channels are formed, the gap collapses by some degree.

As an additional modification to any of the above-described embodiments, side rails or flanges at the side edges of the load beam can also be incorporated in combination with the internal channels. Again, depending on the mechanical properties desired for the end use of the load beam, any number of combinations are possible.

The use of internal channels, as described above, with or without side rails or flanges, provides an advantageous manner of controlling rigidity of a load beam as well as its resonance frequencies. Moreover, such properties are controllable with less height requirements of the overall suspension assembly which is further advantageous for accommodating decreasing load clearances and disk spacings. Furthermore, by providing a relief means through the actuator mounting region, the channels can be formed internally of the side edges of the load beam without causing reworking or substantial changing of the metallurgical properties across the load beam.

In accordance with the present invention, the actuator mounting regions are provided with a relief means accommodating the formation of one or more internal channels. However, the actuator mounting region can comprise any desired configuration depending on its ability to be mounted to a desired actuator assembly, provided a relief means is provided as described above. For example, the base plate 18 may or may not be necessary or may be provided on the opposite side of the suspension assembly. Similarly, the channels and flexures could be provided on opposite sides of the suspension assembly. With plural channels, one or more can be raised from one side of the surface of the load beam while one or more others can be raised from the opposite side surface.

Further modifications are also contemplated within the cross-section of the channels. The channels of FIGS. 1 and 4 comprise two angled sides connected to one another at a desired angle to form a peak. In FIGS. 5–7, channels include two angled sides connected by a raised top surface. The angles of any of these sides can be changed for effecting different mechanical properties to the load beam. The closer the sides are to being perpendicular to the general plane of the load beam, the greater the relief means must compensate for the formation of the channel or channels.

What is claimed is:

1. A method for manufacturing a magnetic head suspension load beam from a generally planar sheet of resilient spring material, including:

shaping a load beam blank having proximal and distal ends, including an actuator mounting region on the proximal end, and a rigid region between the actuator mounting region and the distal end and having side edges;

providing a relief means in the load beam extending through the actuator mounting region from the proximal end for permitting independent shifting of one portion of the actuator mounting region relative to another;

forming at least one channel in the rigid region between the side edges of the load beam while shifting one portion of the actuator mounting region relative to another by way of the relief means.

2. The method of claim 1, the step of providing a relief means comprises providing a channel-compensating gap through the actuator mounting region.

3. The method of claim 2 wherein shaping the load beam blank and providing the channel-compensating gap include etching the blank with the gap from a sheet of stainless steel.

4. The method of claim 1 and further including mounting the actuator mounting region of the load beam blank to a base plate after forming the channel.

5. A method of making a magnetic head suspension load beam from a generally planar sheet of resilient spring material, comprising:

providing at least one load beam blank connected with a carrier strip, the load beam blank having proximal and distal ends including an actuator mounting region on the proximal end that is connected to the carrier strip by a tab and a rigid region between the actuator mounting region and the distal end and having side edges; and forming at least one channel in the rigid region between the side edges of the load beam from the material of the rigid region while shifting one portion of the actuator mounting region relative to another while the load beam blank is connected to the carrier strip, but without causing the carrier strip to be deformed as a result of the channel forming step.

6. The method of claim 5, including the steps of providing a tab region between the actuator mounting region and the carrier strip including a cross-piece extending transversely to the direction from the proximal end to the distal end of the load beam blank and forming a deformation in the cross-piece during the channel forming step.

7. The method of claim 6, further including the step of providing a relief means in the load beam blank extending through the actuator mounting region from the proximal end for permitting independent shifting of one portion of the actuator mounting region relative to another during the channel forming step.

8. The method of claim 7, wherein the step of providing the relief means comprises providing a channel-compensating gap through the actuator mounting region.

\* \* \* \* \*